United States Patent
Koenigsberg et al.

(10) Patent No.: US 6,891,468 B2
(45) Date of Patent: May 10, 2005

(54) VEHICLE BRAKE MONITORING SYSTEM

(75) Inventors: Bernard L. Koenigsberg, Eugene, OR (US); Joel E. Hart, Eugene, OR (US)

(73) Assignee: Hi-Tech Transport Electronics Inc., Eugene, OR (US)

( * ) Notice: Subject to any disclaimer, the term of this patent is extended or adjusted under 35 U.S.C. 154(b) by 107 days.

(21) Appl. No.: 10/260,123

(22) Filed: Sep. 27, 2002

(65) Prior Publication Data

US 2003/0222774 A1 Dec. 4, 2003

Related U.S. Application Data

(60) Provisional application No. 60/387,029, filed on Jun. 4, 2002.

(51) Int. Cl.[7] .................................................. B60Q 1/00
(52) U.S. Cl. ....................... 340/453; 340/454; 340/479; 340/517; 701/29; 701/70; 303/24.1; 303/20
(58) Field of Search ............................... 340/453, 425.5, 340/438, 454, 451, 452, 459, 444, 479, 468, 500, 501, 517, 518; 701/29, 70; 303/20, 24.1

(56) References Cited

U.S. PATENT DOCUMENTS

| | | | |
|---|---|---|---|
| 4,964,679 A | 10/1990 | Rath | |
| 4,991,310 A | 2/1991 | Melia | |
| 5,102,204 A | * 4/1992 | Yoshino et al. | ............. 303/191 |
| 5,339,069 A | 8/1994 | Penner et al. | |
| 5,399,001 A | * 3/1995 | Flournoy | ................... 303/24.1 |
| 5,433,296 A | 7/1995 | Webberley | |
| 5,450,930 A | 9/1995 | Martens et al. | |
| 5,632,359 A | 5/1997 | Camps et al. | |
| 5,649,469 A | 7/1997 | Pierce | |
| 5,791,441 A | 8/1998 | Matos et al. | |
| 5,825,287 A | 10/1998 | Zarybnicky, Sr. et al. | |
| 5,913,385 A | 6/1999 | Thibodeau | |
| 5,967,266 A | 10/1999 | Carnegie | |
| 6,246,316 B1 | * 6/2001 | Andsager | ..................... 340/444 |
| 6,255,941 B1 | * 7/2001 | Osterman et al. | ........... 340/479 |
| 6,325,466 B1 | * 12/2001 | Robertson et al. | ............. 303/20 |
| 6,352,137 B1 | 3/2002 | Stegall et al. | |
| 6,411,206 B1 | 6/2002 | Weant et al. | |
| 6,417,768 B2 | * 7/2002 | Osterman et al. | ........... 340/479 |
| 6,445,993 B1 | * 9/2002 | Eccleston et al. | ............. 701/70 |

OTHER PUBLICATIONS

MGM ®Brakes, e stroke ® brochure (at least as early as Sep. 25, 2002) [located at www.indianheadindustries.com].
Safety–Check Systems Inc., Safety—Check System II brochure (2000) [located at www.safetychecksystems.com].

(Continued)

*Primary Examiner*—Jeffery Hofsass
*Assistant Examiner*—Daniel Previl
(74) *Attorney, Agent, or Firm*—Klarquist Sparkman LLP

(57) ABSTRACT

A vehicle brake monitoring system including processing units receiving signals from each of the several brake stroke sensors mounted on a vehicle. The sensors adapted to generate signal corresponding to stroke movement of the brakes. The system adapted to process the sensor signal, signal from the vehicle's stoplight and a time delay between changes in the stoplight signal and corresponding changes in the sensor signal to determine the current condition of a brake. This determination, whether made on a tractor or trailer, can then appear on the display of the data acquisition unit itself, or through data communications to a display in the vehicle's cab; or on a warning light in the cab if the unit detects a malfunctioning brake.

37 Claims, 11 Drawing Sheets

OTHER PUBLICATIONS

Crewson Industries Inc., Automatic Brake Adjusters—Auto Slack Smart brochure (at least as early as Sep. 25, 2002) [located at www.crewsonindustries.com].

Spectra Inc., Brake Safe ™ brochure (2001) [located at www.spectra–ssa.com].

Brake Sentry Inc., the Brake Sentry ™ visual brake stroke indicator brochure (at least as early as Sep. 25, 2002) [located at www.brakesentry.com].

Launch Technology Enterprises, VisiBrake ™ brochure (at least as early as Sep. 25, 2002) [located at www.visibrake.com].

Bendix Inc., Bendix® Press Release (Mar. 5, 2002) entitled "Bendix® Tool Provides Quick, Accurate Assessment of Brake Adjustment."

Comtrans Products Group, the Stop–R ® visual brake stroke information system brochure (Feb. 21, 1999) [located at www.stop–r.com].

* cited by examiner

VEHICLE BRAKE MONITORING SYSTEM

RELATED APPLICATION

This application claims the benefit of U.S. Provisional Application 60/387,029 filed Jun. 4, 2002, which is incorporated herein by reference.

TECHNICAL FIELD

The present invention relates to an improved vehicle brake monitoring system, particularly for use on heavy vehicles, such as tractor-trailers, and buses. More specifically the vehicle brake monitoring system is related to improved methods of monitoring the stroke movement of a brake and determining its performance condition.

BACKGROUND

Tractor-trailers and other vehicles are typically equipped with brake actuators for engaging or disengaging the foundation brakes (hereafter referred to as the "brakes"). The more common among these actuators are pneumatic actuators, which are also known as air brakes. Such pneumatic brake actuators apply air to a service chamber, which moves a diaphragm connected to a push rod causing the push rod to advance which in turn causes an attached brake to actuate or engage. The push rod is connected to the brake via a link. On the other hand, removing air from the service chamber causes the push rod to retract which in-turn causes the attached brake to move back to its non-actuated position or disengage. Most brakes also have an emergency chamber attached to the service chamber, which is operable to move the push rod if and when the air system fails. To this end, a high strength power spring is typically incorporated into the emergency chamber to actuate the push rod. This spring is also typically used to actuate the push rod when the vehicle is parked.

The push rod within a brake actuator has a predetermined range of possible movement, which is commonly referred to as the "stroke movement." Those skilled in the art may also refer to the stroke movement as a "brake stroke" or simply as a "stroke." Because the brake is associated with the push rod, a brake may also be referred to as having a stroke movement. The stroke movement required to fully actuate a brake must be carefully monitored because it can indicate whether the brake system is functioning properly or not. For example, an excessive amount of stroke required for the brake to fully engage a wheel can indicate several faults in the brake system. Such excessive stroke movement is usually referred to as an "overstroke" condition. Typically, an overstroke condition is caused by the lining of a brake wearing or disintegrating due to repeated use. Overstroke condition can also be caused by the link connecting the push rod to the brake bending, loosening, or experiencing excessive wear. A combination of these conditions may also cause an overstroke condition.

Carefully monitoring the stroke movement can also lead to the discovery of other brake problems besides an overstroke condition. For example, a push rod may not return to its non-actuated position or its fully retracted position even after the brake pedal has been released. This is termed a "dragging brake," and is capable of creating sufficient heat as to cause a fire due to the unwanted friction between the brake and the wheel over a prolonged period of time. Furthermore, when the operator applies the brake pedal the push rods may not move at all to engage the brake. This is termed a brake failure or non-actuation.

Currently, there are several conventional methods of monitoring the appropriateness of a stroke movement. Determining whether excessive stroke movement or an overstroke condition exists is dependent upon the designed stroke movement, or rated stroke movement, of the brake actuator which is well known to the manufacturers of the actuators. Some brake actuators include a visual indicator of a push rod experiencing excessive stroke movement, or approaching an overstroke condition. The visual indicator may be as simple as a band of bright color on the push rod, which should not extend or be visible outside of the brake chamber. An operator who sees that brightly colored band is provided with an indication that the push rod is exceeding, or may soon exceed, its designed stroke movement. Such systems have proven quite beneficial in early detection of brake problems. However, such visual systems require the operator to physically check each brake station beneath the vehicle to see the indicators of excessive push rod movement. Such systems are not convenient, require too much time and do not provide real-time information about the condition of the brakes to an operator.

Another example of a conventional vehicle brake monitor is described in U.S. Pat. No. 6,255,941 issued to Osterman et al. (hereafter referred to as the "'941 patent"). The brake monitoring system of the '941 patent includes a Hall-effect sensor mounted within the housing of a brake actuator, and a magnet with adjacent north and south magnetic fields mounted to the push rod. The sensor is used to track the movement of the push rod by sensing the movement of the attached magnet relative to the sensor's own location. Each magnet has a specific magnetic profile from its north pole to its south pole and the Hall effect sensor can determine the position of the magnet by sensing the changing magnetic field as the magnet moves. The Hall-effect sensor of the '941 patent is a ratiometric linear Hall-effect transistor, wherein the output voltage of the sensor signal is proportional to the input signal voltage and the applied magnetic field. Thus, when push rod and the associated magnet are in the non-actuated position the Hall-effect sensor senses no magnetic field and yields an output signal voltage equal to the input voltage signal which is 2.5 volts in the '941 patent.

In the magnet of the '941 patent the transition point where the two adjacent north and south fields come together has no magnetic field at all. Therefore, if the transition point is in front of the sensor the sensor senses no magnetic field at all, similar to when the magnet is in the non-actuated position. In the actuator of the '941 patent the transition point is located so as to correspond to the brake being in an overstroke condition. Thus, the output voltage of the sensor signal of the '941 patent indicates 2.5 volts for both an overstroke condition as well as a non-actuated brake condition. Reading the sensor signal of the '941 patent alone cannot indicate the difference between overstroke condition and a non-actuated brake condition. Likewise, ambiguity of the sensor signal affects the ability of a monitoring system to detect other brake conditions.

Therefore, there is need for a vehicle brake monitoring system that can accurately monitor the stroke movement of a push rod and use the resulting data to indicate the condition of a brake. There is further need for a vehicle brake monitoring system that can provide the operator of a vehicle with real-time information indicative of the performance condition of the vehicle's brakes.

SUMMARY

An improved vehicle brake monitoring system is described herein that includes a plurality of sensors for sensing the stroke movement of a vehicle brake. The vehicle brake monitoring system overcomes the problems associated with the conventional brake stroke monitoring systems described above by monitoring both the distance and the direction of a stroke movement. Thus, the improved vehicle brake monitoring system is able to accurately detect brake conditions such as an overstroke condition, a failed brake condition, a normal non-actuated brake condition, normal braking condition, and a dragging brake condition. More specifically, the vehicle brake monitoring system overcomes the ambiguity in the sensor signal levels corresponding to the stroke movement by processing input variables in addition to the sensor signal values such as, the state of a stoplight signal indicating the operator has applied or released the brake pedal, and by accounting for a time delay between a change in the stoplight signal state and the corresponding change the sensor signal. The system uses the time delay data to activate a time out clock, which is adapted to generate a signal upon reaching an optimal time delay for the change in state.

In one embodiment the vehicle brake monitoring system comprises sensors capable of providing an electronic signal indicative of the stroke movement of an associated brake. In this embodiment the sensor signal comprises a range of voltage values which correspond to a range of positions of the brake within its stroke movement. The vehicle brake monitoring system is programmed to divide this range of voltage values into multiple zones wherein the zones correspond to the position of the brakes within their stroke movement. The vehicle brake monitoring system is further adapted to receive the state of the stoplight signal and to use time delay data related to the time delay between a change in the stoplight state and the corresponding change in the sensor signal. Furthermore, the vehicle brake monitoring system is programmed to combine the current state of the stoplight signal state, the current identity of a zone of sensor signal and the time delay data to accurately indicate the various performance conditions of a vehicle's brakes.

In one embodiment the vehicle brake monitoring system comprises a distributed network of processing units which are programmed to process the stoplight signal state, the sensor signal and the time delay data as described above to provide information indicative of the condition of all the brakes of a vehicle. Furthermore, the distributed network comprises at least one remote processing unit and one master-processing unit. The master processing unit is capable of receiving data from the remote processing which indicates the condition of the respective brakes being monitored by the remote processing units. The master processing unit is further capable of combining and organizing the brake condition data from the remote processing units for displaying the data to an operator in a single location convenient for viewing. This provides the operator an advantage of seeing real-time brake condition data for all brakes of the vehicle in one place. Furthermore, the distributed nature of the network of processing units allows for easy addition and removal of the processing units and other resources as corresponding brakes are added and removed from the vehicle.

In a further embodiment of the vehicle brake monitoring system, the master-processing unit is adapted to monitor the brakes of the tractor unit of a multi-unit cargo truck which has a tractor unit and at least one trailer unit. The multiple remote processing units are preferably adapted to monitor the brakes associated with one or more of the trailer units. In one embodiment of the improved vehicle brake monitoring system, the communications network connecting the master-processing unit on the tractor and one or more of the remote processing units on the trailers comprise a power line network. Both the master processing unit and each one of the remote processing units have a power line modem, each of which connects to a pair of power lines of the power line network of the vehicle. The power line modems communicate over the existing power lines of the vehicle for inter-system communication and ease of after market addition of processing unit. Furthermore, the power line network is adapted to receive communication from other vehicle components that are also adapted to communicate with the power line network such as on-board scales or input/output multiplexors.

In one embodiment of the vehicle brake monitoring system, the stoplight signal may derive directly from a connection to the stoplight itself. In this embodiment the stoplight signal state is either on or off. In another embodiment the stoplight signal to the master can originate from a multiplexor, which is most commonly used on transit buses. In such a multiplexed unit the signal is communicated to the stoplights at the rear of the vehicle multiplexed with other signals necessary to operate the vehicle. Furthermore in such a multiplexed unit the stoplight signal may have to switch between two of three possible states: on, off, or floating. If one of the states is floating, it is necessary to avoid unintended signal interference between the data acquisition system and the multiplexor, so that the stoplight is not turned on when the driver intends it to be off or vice versa. In one embodiment a diode fuse may be suitably used to prevent interference between the processing unit and the multiplexor.

DETAILED DESCRIPTION

An improved vehicle brake monitoring system is described below with reference to the accompanying drawings, in which illustrative embodiments are shown.

This system may, however, be embodied in many other different forms. Like numbers refer to like elements throughout.

General Functionality of a Vehicle Brake Monitoring System

Figure 1:
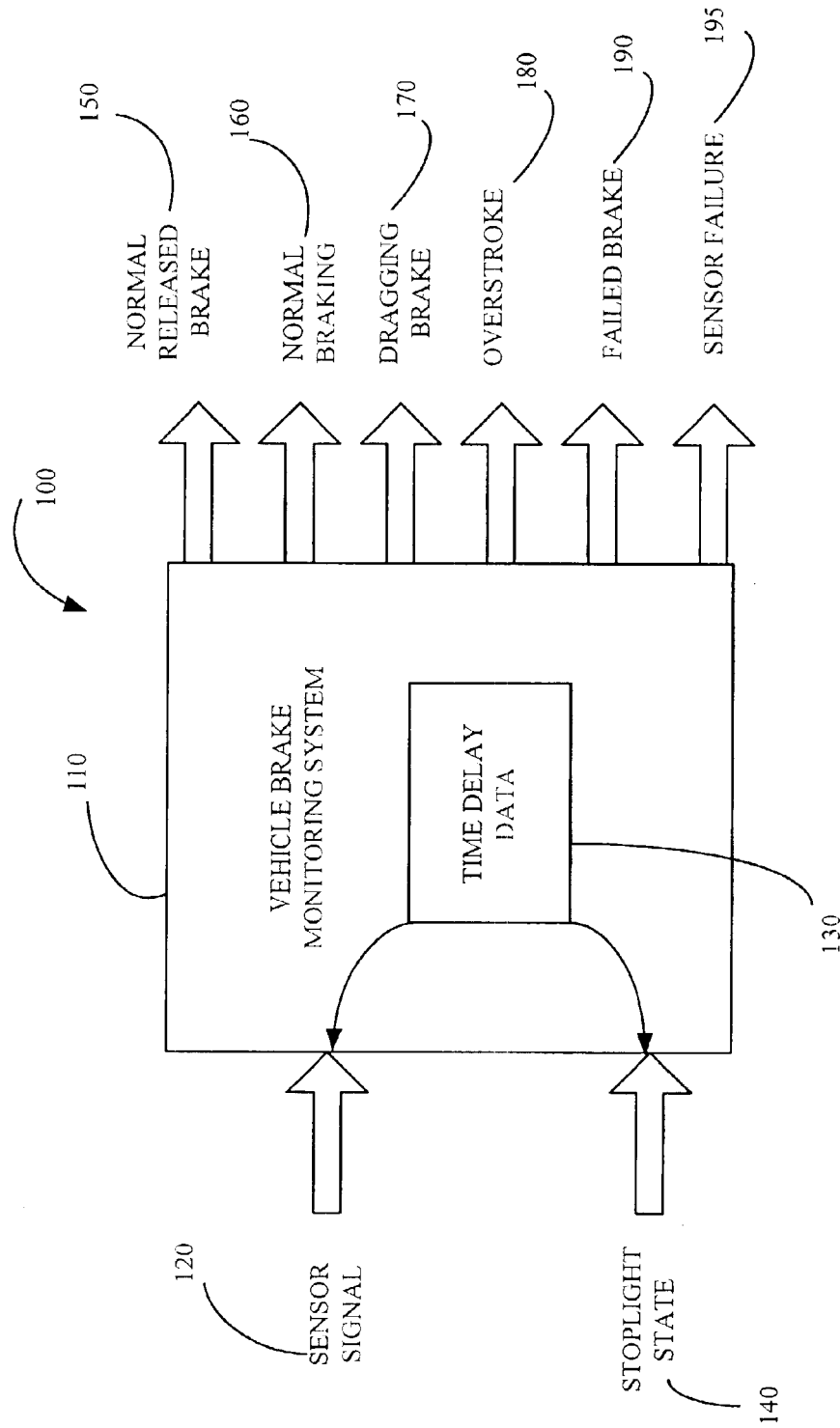
FIG. 1 is a block diagram showing the general functionality of the vehicle brake monitoring system.

FIG. 1 shows the general functionality of a vehicle brake monitoring system with reference to input data received and output data displayed by the system. This vehicle brake monitoring system uses a Hall-effect brake stroke sensor similar to the one described in the '941 patent to monitor and detect the performance condition of a brake. However, this system 110 is also programmed to resolve the ambiguity in a Hall-effect sensor signal by processing the sensor signal 120 along with other data associated with a vehicle's brake system such as, time delay data 130 and stoplight state data 140. The stoplight state data 140 indicates whether the vehicle's stoplight indicator is in the on or off state, which corresponds to the brake pedal being applied or released by an operator.

The vehicle brake monitoring system is programmed to combine a present stoplight state 140 with a present position of the brake within its stroke movement corresponding to the sensor signal 120 to define a present state for the brake. The system is further programmed to monitor the changes from one state to another as either the sensor signal 120 or the stoplight state 140 changes. The system is also programmed to account for the time delay between the change in the sensor signal and the stoplight state. For example, once the stoplight state changes to the off state the sensor signal should change to a level indicating that the brake is now non-actuated because the operator has released the brake pedal. However, such changes are not instantaneous because of the mechanical delay in the brake retracting once the brake pedal is released. This delay between the sensor signal 120 and the stoplight state 140 is referred to as the time delay data 130. Through experimentation it is possible to determine the time delay between changes in a state for any brake system. The selected values of optimal time delay between the stoplight state changes and the corresponding change in sensor signal comprises the time delay data.

The vehicle brake monitoring system is programmed to process the sensor signal 120, the stoplight state 140 and the time delay 130 to provide data related to brake performance condition such as, normal released brake 150, normal braking 160, dragging brake 170, overstroke 180 or failed brake 190. The vehicle brake monitoring system is also programmed to process a sensor failure 195 that would render the useless for determining brake performance condition. The specific methods and systems for monitoring brake condition are described in further detail below.

Figure 2:
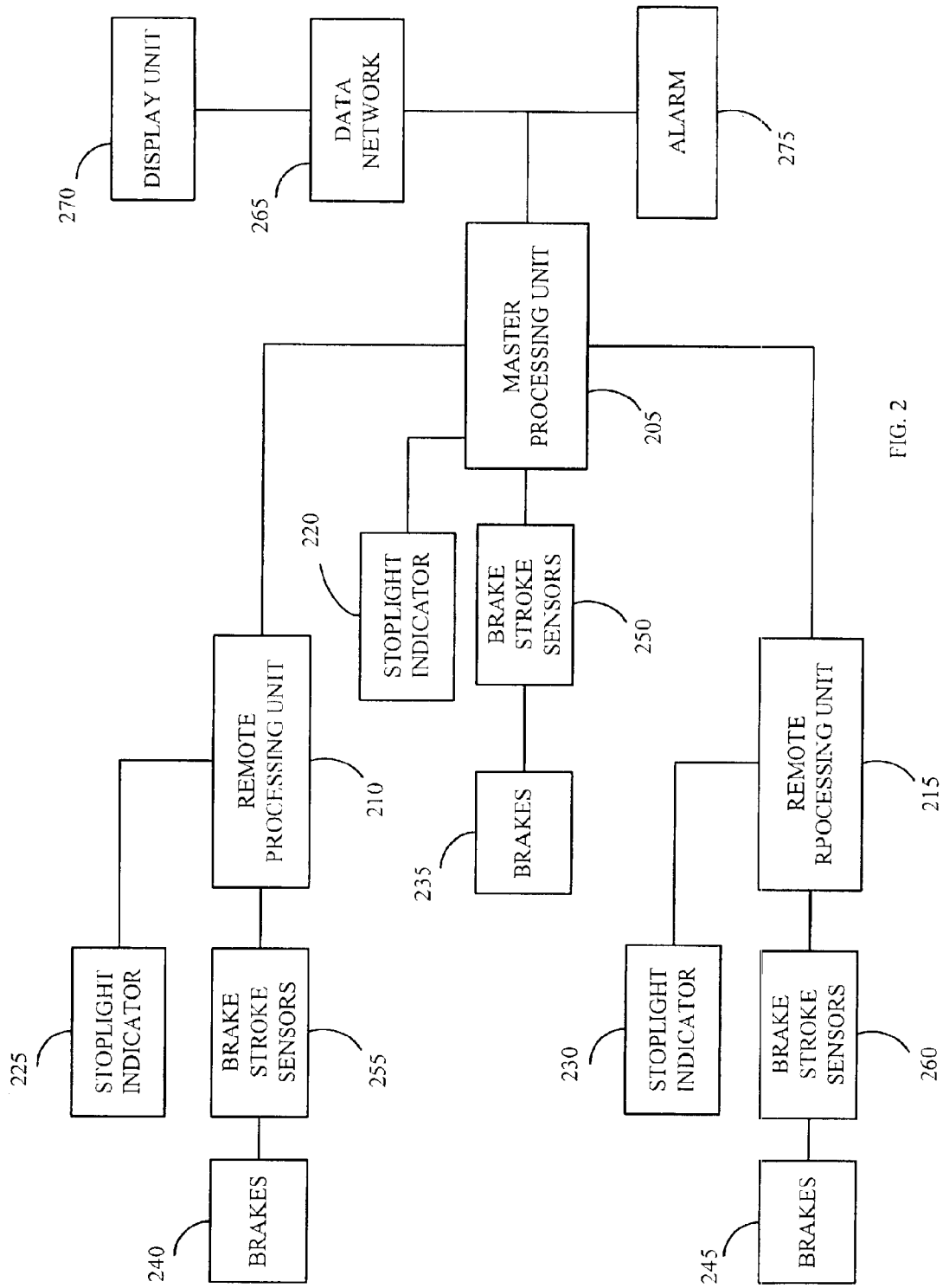
FIG. 2 is a block diagram showing the various components of the vehicle brake monitoring system and the manner in which they are connected to each other.

Components of the Vehicle Brake Monitoring System and a General Manner in which They are Connected to Each Other FIG. 2 shows a vehicle brake monitoring system with the various components of the system connected to each other in a preferred manner to attain the functionality described above with reference to FIG. 1. The system usually comprises at least one master processing unit 205 and may include multiple remote processing units such as, 210 and 215, however the system would still be functional for display at the unit even without a master processing unit 205, with only one or more remote units 210 and 215. The number of remote processing units may depend on the number of brakes on the vehicle. For example, in a vehicle including a tractor-trailer combination the master processing unit preferably monitors the tractor, and multiple remote processing units are associated with the multiple trailers. However, other embodiments may have just one remote processing unit or no remote processing units at all. Each of the remote processing units 210 and 215 are connected to the master processing unit 205.

Additionally, each processing unit, including the master processing unit, is connected to a corresponding set of brake stroke sensors 250, 255 and 260 for sensing the stroke movement of brakes, 235, 240, or 245 respectively. Each processing unit 205, 210, and 215 is also associated with a corresponding stoplight indicator such as 220, 225, and 230 adapted to indicate whether the operator has applied the brake pedal or not.

As shown in FIG. 2, each processing unit 205, 210 and 215, is connected to a single brake 235, 240, and 245. However, each processing unit is capable of being connected to multiple brakes and stop light indicators. On the other hand, it is desirable for each brake 235, 240, and 245 to be associated with just one brake stroke sensor 250, 255 and 260.

In a vehicle brake monitoring system, each processing unit 205, 210 and 215 is adapted to receive input data from components such as brake stroke sensors 250, 255 and 260, and stoplight indicators 220, 225, and 230. Each processing unit 205, 210 and 215 is programmed to process such input data to provide output data indicating the condition of the brakes. However, the master processing unit 205 is further adapted to process the brake condition information provided by each of the remote processing units 210 and 215 to provide the operator of a vehicle the complete picture of the condition of all the brakes of a vehicle at one display unit 270. The master processing unit 205 is connected to a data network 265 for broadcasting the output of the vehicle brake monitoring system to the vehicle operator through the display unit 270. Besides describing the condition of each brake the display unit 270 is also adapted to point out the location of each brake.

The master processing unit 205 is also adapted to activate the alarm 275 whenever a brake fault is detected in a brake. Any brake condition that is not normal such as dragging brake, overstroke or failed brake will result in a brake fault causing the operator to be alerted by the alarm 275. Once he is alerted by the alarm 275 an operator can to look at the display unit 270 to discover the exact location of the brakes triggering the alarm and take remedial action. The capabilities and functionality of each of the components shown above in FIG. 2 is described in further detail below as mounted to a vehicle in FIG. 3 below.

Figure 3:
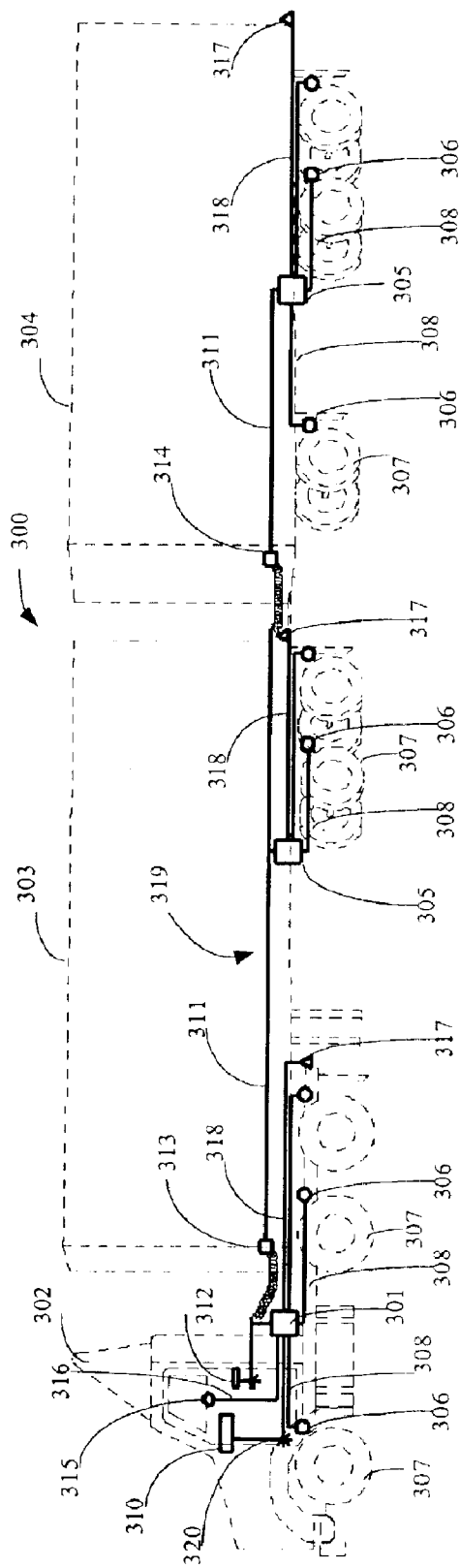
FIG. 3 is a side view of a tractor-trailer unit with the components of the vehicle brake monitoring system mounted as shown in FIG. 2.

A Specific Embodiment of the Vehicle Brake Monitoring System as Mounted on to a Vehicle with a Tractor Unit and a Trailer Unit FIG. 3 shows the components of a vehicle brake monitoring system connected as shown in FIG. 2 and mounted on a vehicle 300. In the embodiment illustrated in FIG. 3, the vehicle brake monitoring system is shown mounted on a tractor-trailer vehicle 300 comprising a tractor 302 and double trailers 303, and 304. Since FIG. 3 is a perspective view of the vehicle 300 some of the parts on the side of the vehicle 300 opposite to the side shown in FIG. 3 will be hidden. However, the description of the vehicle 300 with respect to the side shown in FIG. 3 applies equally to the hidden side. The various components of the system are shown connected to each other as shown in FIG. 2.

Each of the brake stroke sensors 306 are associated with a single vehicle brake (not shown in FIG. 3) on each wheel 307 of the vehicle 300. The brake stroke sensors 306 are transducers adapted to generate and send electrical signals corresponding to the stroke of a brake's push rod to either a master processing unit 301 or a remote processing unit 305. Some of the brake stroke sensors 306 correspond to a brake on the tractor 302 and therefore, are adapted to send their output signal to the master processing unit 301. All brake stroke sensors 306 not corresponding to the tractor unit 301 are connected to one of the remote processing units 305. The brake stroke sensors 306 are connected to the master processing unit 301 and remote processing units 305 via the cables 308. A preferred form of the brake stroke sensor 306 is described in further detail below with reference to FIG. 4.

The master processing unit 301 and remote processing unit 305 are also adapted to receive the state of the stoplight indicator 317 which is adapted to provide an on signal when the brakes are applied. In this embodiment, each of the stoplight indicators 317 is connected to a master processing unit 301 or a remote processing unit 305 via the wires 318.

Furthermore, each of the remote processing units 305 is further connected to the master processing unit 301 via a communications network 319. The remote processing units 305 are adapted to communicate the condition of their associated brakes to the master processing unit 301. The master processing unit 301 is capable of combining the brake condition data received from the remote processing units 305 with the brake condition data of the brakes directly associated with itself and broadcasting the condition of all brakes through an electrical junction onto the truck status data network 320. A driver information display 310 is connected to the truck status data network 320 along with other network-compatible devices adapted to provide other vehicle status information such as condition of the engine, the transmission etc. In the preferred embodiment a standard J1708 data network is used to broadcast vehicle information to an operator, however other networks such as are used on trucks, such as J1939 or J2497 (also known as PLC4TRUCKS) would be equally suitable. J1708, J1939 and J2497 are communications standards promulgated by the Society of Automotive Engineers (SAE), although J2497 is yet to be published. The master processing unit 301 is further adapted to alert the operator of brake faults such as overstroke, dragging brake and failed brake, as described above with respect to FIG. 2, via an alarm 315 to which it is connected by a wire 316.

In one embodiment, the communications network 319 comprises two wires of a six-wire cable commonly referred to as the power line cable 311. The power line cable 311 in addition to containing the two wires corresponding to the communications network also includes wiring such as, power-supply wires for the anti-lock brake system and power-supply wires for the master processing unit and remote processing units. The power line cable 311 can therefore be adapted to serve as a single conduit for carrying power and data signals between the tractor 302 and the trailer 303 and between the trailers 303 and 304. The power line cable 311 includes disconnect plugs 313 and 314 respectively, which are adapted to easily disconnect during detachment of the trailers 303 and 304 from each other or from the tractor 302. The disconnect plugs 313, 314 preferably are neoprene-coated for weatherproofing and durability.

Figure 4:
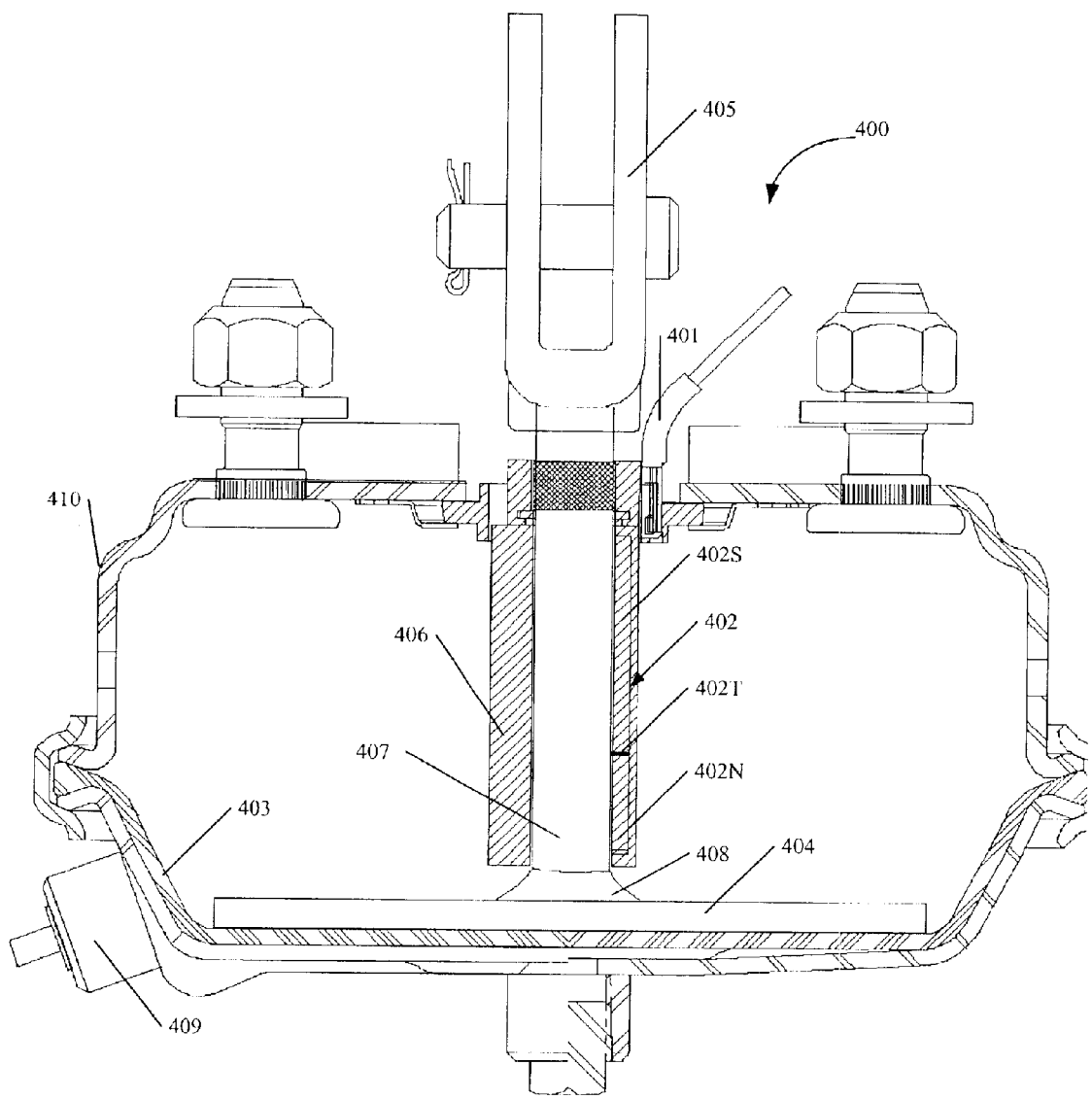
FIG. 4 is a sectional view of a brake actuator and a sensor of the vehicle brake monitoring system.

Description of One Embodiment of a Brake Actuator Adapted to Hold a Sensor of the Vehicle Brake Monitoring System FIG. 4 shows one embodiment of a brake actuator 400 fitted with a brake stroke sensor 401 of the vehicle brake monitoring system. The model used in the preferred embodiment is a MGM eStroke pneumatic brake actuator, which is available through Indian Head Industries of Charlotte, N.C. Although a pneumatic brake is preferred because it is widely used, any other actuators such as the ones actuated by a spring are also equally suitable. This brake actuator uses air pressure or pneumatic power to cause the brakes to engage wheel. When an operator applies a vehicle's brakes, compressed air is forced through a port 409 into the housing 410, which inflates a diaphragm 403 which forces up a plate 404 and a push rod 407 welded to the plate 404 at 408. The push rod 407 in turn pushes up a clevis 405 attached to the push rod 407, activating a foundation brake (not shown) for stopping the vehicle. Thus, the stroke movement of the push rod 407 corresponds to the stroke movement of a brake as it engages and disengages a wheel.

Measuring the stroke movement can indicate the performance condition of a brake. For example, if the push rod is pushed up beyond a designed threshold stroke movement limit, that could indicate an overstroke condition which may be the result of brake problems such as worn brakes or loose connections between the components of the actuator 400 and the brake. Furthermore, when the operator applies his foot on the brake pedals and the push rod 407 does not move at all, that could indicate a brake failure. The master processing unit 205 or the remote processing units 210 and 215 of FIG. 2 use the data associated with sensing the stroke movement to indicate the performance condition of a brake.

In this embodiment the brake actuator 400 is fitted with a brake stroke sensor 401 adapted to sense the movement of the push rod 407. An elongated magnet 402 comprising two adjoined magnets a north magnetic field magnet 402N and a south magnetic field magnet 402S is affixed to the push rod 407 by a plastic sleeve 406. The point of transition between the north magnetic field magnet 402N and the south magnetic field magnet 402S is shown at 402T.

When the push rod 407 moves, the magnet 402 passes a Hall-effect sensor 401 which is electrically connected to the master processing unit 205 or one of the remote processing units 210 and 215 shown in FIG. 2. The Hall-effect sensor 401 is adapted to sense the stroke movement of the push rod and the attached brake by sensing the movement of the magnet 402. A Hall-effect sensor suitable for the purposes of this invention is described in U.S. Pat. No. 6,255, 941(the '941 patent), issued to Osterman et al., which is incorporated herein by reference. The Hall-effect sensor of the '941 patent is a ratiometric linear Hall-effect transistor, wherein the output voltage of the sensor signal is proportional to the input signal voltage and the applied magnetic field. As the magnet 402 moves up and down in front of the sensor 401 the magnetic field sensed by the sensor changes thereby affecting the voltage value of the sensor's output signal.

In FIG. 4 the actuator 400 is shown in a non-actuated condition with the magnet 402 in its corresponding non-actuated position. As the brake actuator actuates the magnet 402 will move in an upward direction in front of the sensor 401. The designed stroke of brake corresponds to the range of motion of the magnet 402 from its non-actuated position as shown in FIG. 4 to a point when the transition point 402T is directly in front of the sensor 401. Stroke movement beyond the transition point 402T brake indicates an overstroke condition. This range of movement during a brake stroke is translated to a range of values for the sensor's output signal.

Sensor Signal Corresponding the Stroke Movement of a Brake

Figure 5:
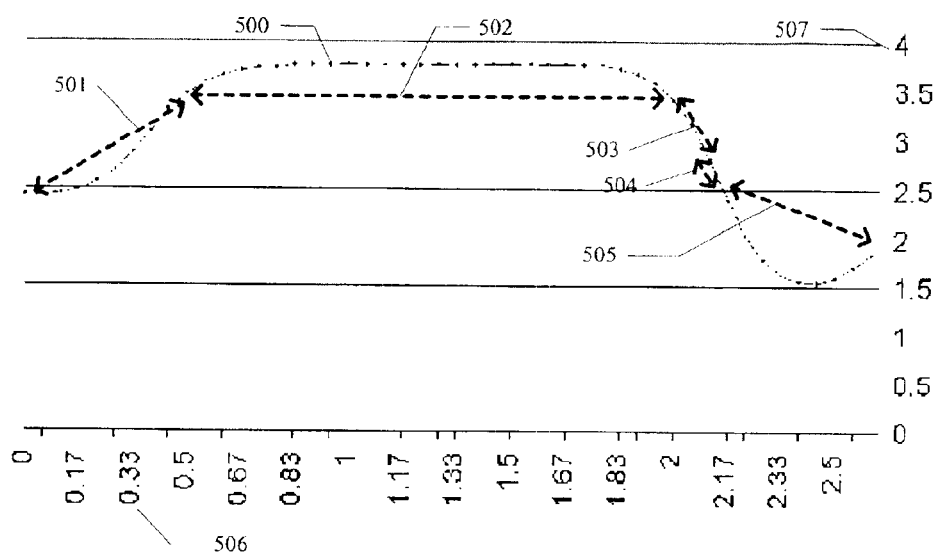
FIG. 5 is a diagram showing voltage values of the sensor signal generated by a Hall-effect sensor of the vehicle brake monitoring system.

As described with reference to FIG. 4 the brake sensor 401 is adapted to provide an electronic signal indicative of the stroke movement. The signal is provided to a master processing unit 205 of FIG. 2 or any one of the remote processing units such as, 210 and 215 for further processing. One embodiment of an electronic signal indicative of the stroke movement is shown in FIG. 5. As shown in FIG. 5, the sensor signal 500 comprises voltage values corresponding to scale 507. The corresponding position of the brake within its stroke movement is indicated on scale 506. The sensors of the vehicle brake monitoring system are adapted to provide an output signal with voltage values between 1.5 volts to 3.75 volts.

The vehicle brake monitoring system divides the sensor signal 500 into five zones shown as Zone A at 501, Zone B at 502, Zone C at 503 and Zone D at 504. Zone A 501 begins at 2.5 volts and ends at 3.5 volts, Zone B 502 begins at 3.5 volts and ends at 3.75 volts, Zone C 503 begins at 3.5 volts and ends at 2.6 volts, Zone D 504 begins at 2.6 volts and ends at 2.5 volts, and Zone E 505 begins at 2.499 volts and ends at 1.5 volts. Also, the vehicle brake monitoring system is adapted to correspondingly associate each zone A-E 501–505 with a specific brake condition. Zone A 501 corresponds to a brake at rest or beginning to actuate, Zone B 502 corresponds to a normal actuated brake, Zone C 503 corresponds to a brake that has passed the normal actuation zone and is approaching the overstroke zone. Zone D 504 and Zone E 505 correspond to an overstroke zone. Additionally, when there is no sensor signal at all or the sensor signal's voltage value is less than 0.5 volts that is an indication of a failed sensor. The vehicle brake monitoring system is adapted to sense such low voltage sensor signals to indicate a failed sensor condition.

However, the sensor signal 500 suffers from the same problem as the sensor signal of the '941 patent. A processor cannot determine which zone the brake is in by processing the sensor signal 500 alone. For example, Zone A 501 has a overlapping range of voltage values, 2.5–3.5 volts, as Zone C 503 at 2.6–3.5 volts and Zone D 504 at 2.5–2.6 volts, even though the actual position of the corresponding push rod 407 is completely different in each zone. However, in this vehicle brake monitoring system, the processing units 205, 210 and 215 of FIG. 2 are programmed to use the sensor signal 500 in addition to the stoplight state signal and time delay data to provide a clear indication of its position within the stroke movement. One embodiment of the programming of the processing units 205, 210 and 215 is described below in detail with reference to FIGS. 6A and 6B.

Various Alternative Embodiments of a Brake Actuator Adapted to Hold a Sensor for Sensing the Stroke Movement Although the preferred stroke sensor 401 is a Hall-effect sensor, other methods of sensing the movement of the push rod 407 can be used for the purposes of this invention. For example, the push rod 407 can be adapted to have a surface that is capable of reflecting an optical signal. An optical signal generator can be used to transmit signals that are reflected by the push rod 407. The signal generator can be positioned in such way that the strength of the reflected signal corresponds to the position of the push rod 407. An optical sensor can then be used to detect the position of the push rod 407 by reading the reflected signal and passing an electronic signal indicative of the position of a push rod 407 to a processor.

In a further alternative embodiment a mechanical lever can be used to monitor the motion of the push rod 407. The lever can be mounted on the push rod and adapted to receive a pot resistor that is part of an electronic circuit adapted to generate a voltage signal that is indicative of the position of the lever connected to the push rod. One skilled in the art will recognize that there are many such different methods for sensing the position of the push rod and translating it to an electronic signal indicative of the stroke movement to be used by a processor.

Figure 6A:
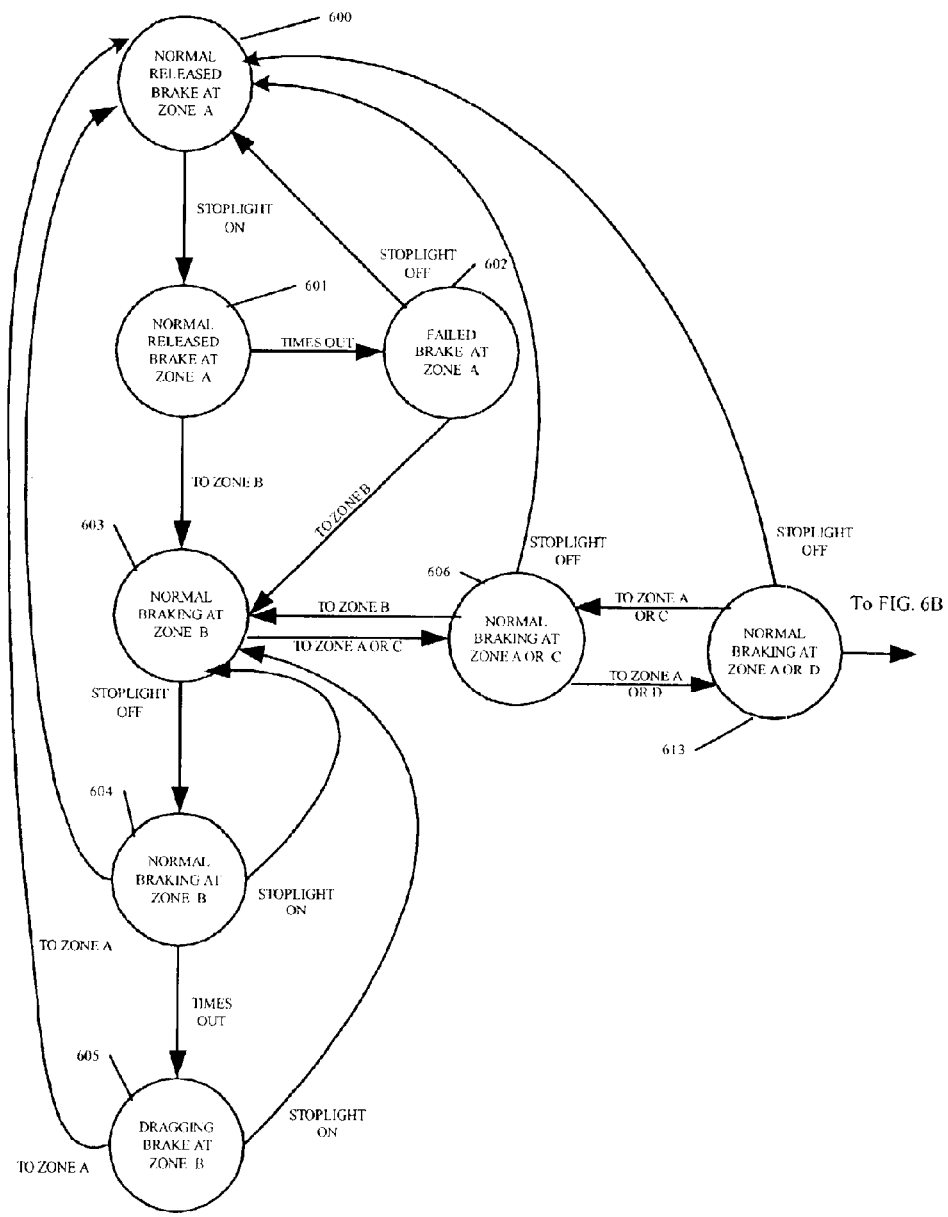
FIG. 6A and FIG. 6B together comprise a state diagram representing the programming of the vehicle brake monitoring system for real-time monitoring of brake conditions.
Figure 6B:
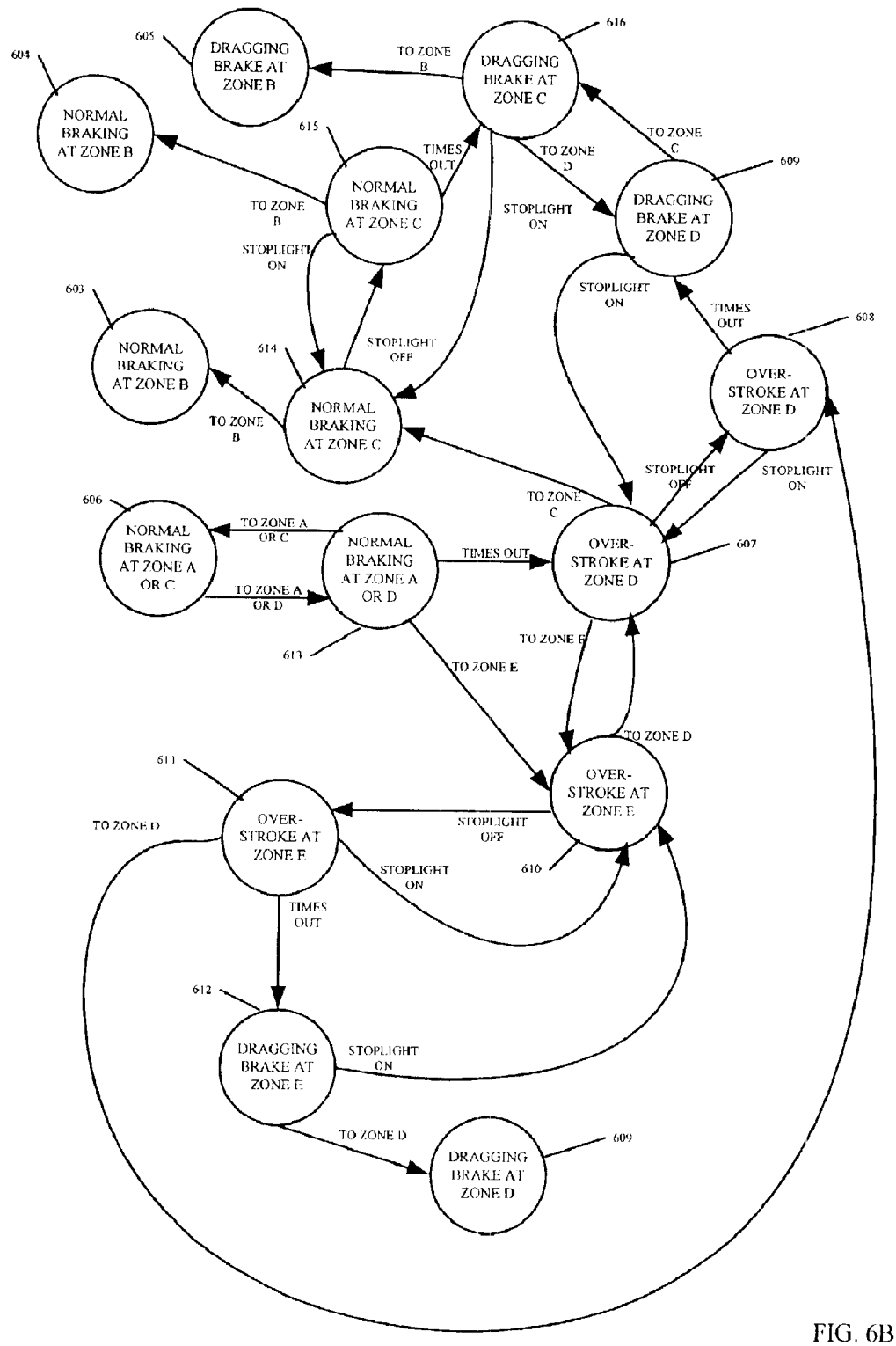

An Algorithm for Real-Time Processing by the Vehicle Brake Monitoring System for Accurately Determining the Position of the Brake Within its Stroke Movement In FIGS. 6A and 6B, an algorithm of the programming of the master processing unit 205 and the remote processing units 210 and 215 is shown in form of a state diagram. In this state diagram each state is indicated within a state circle such as, state 600 and state 601. Preferably, each state indicates the current brake condition as determined by the corresponding processing unit 205, 210 or 215. The brake condition may be any one of such conditions as normal braking, normal released brake, dragging brake or failed brake. Furthermore, each state circle also indicates which one of the multiple zones A-E 501–505 of FIG. 5 the brakes is currently in.

The programmed microprocessor associated with the master processing unit 205 or the remote processing units 210 and 215 (hereafter referred to as the "processor") of FIG. 2 passes from one state to another in response to three kinds of variables. The first such variable is the state of a stoplight signal and the second such variable is the signal from the sensor. The third such variable is a time out signal. The time out signal is generated by a time out clock within each of the processing units and indicates that the system has waited for a optimal time out period to account for the time delay between a change in state of the stoplight state and a corresponding change in the sensor signal. Each of the processors associated with the processing units 205, 210 and 215 of FIG. 2 are adapted to start a time out clock in correspondence with an internal clock synchronized with the rest of the vehicle monitoring system. FIGS. 6A and 6B show directed lines with arrows to show the processor transition from one state to another, with the cause of the transition indicated next to the line.

At the beginning of a braking cycle, when the brake is not actuated, the brake is at Normal Released Brake At Zone A state 600. Once the stoplight turns on, and the sensor signal of FIG. 5 is in Zone A 501, the processor moves to Normal Released Brake At Zone A state 601, starts a time out clock and waits for 200 milliseconds. The time out period will help the processor to determine whether the brake stroke was just passing through Zone A 501 of FIG. 5 on the way to Zones B–D 502–505 or whether the brake never actuated when the operator stepped on the brake pedal. Once the time out period of 200 milliseconds passes (referred to in FIGS. 6A and 6B as "times out") without a zone change the microcomputer passes to a Failed Brake at Zone A state 602, which indicates a failed brake condition. However, if the processor remains in Normal Released Brake at Zone A state 601 for less than 200 milliseconds before moving to Zone B, and the stoplight remains on, the processor passes to Normal Braking at Zone B state 603. The 200 milliseconds are an estimate of the time it normally takes the brake stroke to pass through the Zone A on the way to Zone B. Other estimates may be required based on different brake designs or weather conditions.

While in Non-Actuated Brake at Zone A state 602, if the stoplight turns off, the processor returns to the Normal Released Brake at Zone A state 600. However, if the stoplight remains on in the Non-Actuated Brake At Zone A state 602 and the sensor signal changes to Zone B 502 of FIG. 5, the processor passes to Normal Braking at Zone B state 603.

Once the processor is at Normal Braking at Zone B state 603, if the stoplight signal turns off, the processor passes to Normal Braking at Zone B state 604 and waits there for a time out period of about 6 seconds, for the sensor signal to return to Zone A. The time delay here is required because it usually takes sometime for the brake to mechanically retract to a non-actuated position once the operator lifts his foot off the pedal. The 6 seconds are an estimate of the time it normally takes a brake to return to a non-actuated position from its actuated position. However, depending on factors such as the cold weather it is possible for the brake to take as much as 60 seconds to return to its non-actuated position. If the sensor signal does return to Zone A within this period of 6 seconds, the processor changes back to the Normal Released Brake at Zone A state 600. However, if the sensor signal remains at Zone B once the stoplight is off and the 6 second time delay passes then the processor moves to the Dragging Brake At Zone B state 605. Such a dragging brake state suggests that the brake has not retreated back to its non-actuated position even though the operator has lifted his foot off the brake pedal. While at Dragging Brake At Zone B state 605 or Normal Braking At Zone B state 604, if the stoplight turns back on then the processor returns to Normal Braking At Zone B state 603.

When the processor is in the Normal Braking At Zone B state 603 with the stoplight signal still on and the sensor signal changes to Zone A Or Zone C which could correspond either to Zone A 501 or to Zone C 503 of FIG. 5, the processor changes state to Normal Braking At Zone A Or C 606. If the stoplight turns off in this Normal Braking at Zone A or C state 606, the processor changes the state back to Normal Released Brake at Zone A 600. However, if the stoplight remains on at Normal Braking At Zone A Or C state 606 but the sensor signal returns to Zone B, the processor returns to Normal Braking At Zone B state 603. If the sensor signal instead changes to Zone D 504 of FIG. 5 with the stoplight signal remaining on, the processor changes the state to Normal Braking At Zone A Or D state 613, and waits for a period of time, preferably 2 seconds, for the stoplight signal to turn off. The 2 seconds time out period is in place to ensure that the signal is really in zone D and not in zone A, which has similar voltage values. The 2 seconds time out period is more than an estimated amount time it takes for the stoplight to turn off once the brake is no longer actuated when the brake is really in Zone A. If the stoplight signal turns off in this period, the processor changes the state back to Normal Released Brake At Zone A state 600. However, while stoplight signal remains on at Normal Braking At Zone A Or D state 613 but the sensor signal changes back to Zone C 504 of FIG. 5 then the processor returns to Normal Braking At Zone A Or C 606.

The state diagram as described with reference to FIG. 6A will be continued with reference to FIG. 6B. Some states are on both FIG. 6A and FIG. 6B, specifically Normal Braking At Zone B 603, Normal Braking At Zone B 604, Dragging Brake At Zone B 605, Normal Braking At Zone A Or C 606, and Normal Braking At Zone A Or D 613, because they have transitions to or from other states some of which are on FIG. 6A while others are on FIG. 6B. In FIGS. 6B and 6A at Normal Braking At Zone A Or D 613 if the stoplight signal does not turn off in the 2 second time out period, that indicates that the operator has applied the brake and the brake is in an overstroke condition at Zone D. Thus, the processor changes to Overstroke At Zone D state 607. The 2 second time out period ensures that the sensor signal is really in zone D and not in zone A, which has similar voltage values.

Once at Overstroke At Zone D state 607, while the stoplight signal remains on, if the sensor signal returns to Zone C 503 at FIG. 5 then the processor returns to Normal Braking At Zone C 614. However, at Overstroke At Zone D state 607 if the stoplight signal turns off, while sensor signal remains at Zone D 504 of FIG. 5 then the processor moves to Overstroke At Zone D state 608. This state Overstroke At Zone D 608 differs from the previous state Overstroke At Zone D state 607 by the fact that stoplight signal is now in the off position. Once at Overstroke At Zone D state 608, if the stoplight signal remains off for a time out period of 6 seconds the processor moves to the Dragging Brake At Zone D state 609 because the operator has disengaged the brake pedal but the brake stoke sensor signal continues to remain at an actuated level Zone D 504 of FIG. 5. However, at Dragging Brake At Zone D state 609 with stoplight remaining in the off position the sensor signal moves to zone C 503 of FIG. 5 then the processor moves to the Dragging Brake At Zone C state 616. On the other hand, if the stoplight signal turns back on while the processor is at Dragging Brake At Zone D state 609 state then the processor returns to the Overstroke At Zone D state 607.

Furthermore, in FIG. 6B, once at Normal Braking at Zone C state 614, if the stoplight signal turns off, while the sensor signal remains at Zone C 503 of FIG. 5 then the processor moves to Normal Braking At Zone C state 615. This state Normal Braking At Zone C state 615 differs from the previous state Normal Braking At Zone C state 614 by the fact that stoplight signal is now in the off position. Once at Normal Braking At Zone C state 615, if the stoplight signal remains off for a time out period of 6 seconds the processor moves to the Dragging Brake At Zone C state 616 because the operator has disengaged the brake pedal but the brake stoke sensor signal continues to remain at an actuated level Zone C 503 of FIG. 5. However, at Dragging Brake At Zone C state 616 with stoplight remaining in the off position the sensor signal moves to zone B 502 of FIG. 5 then the processor moves to the Dragging Brake At Zone B state 605. On the other hand, if the stoplight signal turns back on while the processor is at Dragging Brake At Zone C state 616 state then the processor returns to the Normal Braking At Zone C state 614.

Furthermore, in FIG. 6B, once at Overstroke At Zone D state 607 if the sensor signal moves to Zone E 505 of FIG. 5 with the stoplight still on then the processor moves to Overstroke At Zone E state 610. The processor may return back to Overstroke At Zone D state 607 if the sensor signal returns to Zone D 503 of FIG. 5 with the stop light still in the on position. However, once at Overstroke At Zone E state 610 if the stoplight turns off the processor moves to Overstroke At Zone E state 611. Once at Overstroke At Zone E state 611 if the stoplight remains turned off for a time out period, preferably 6 seconds then the processor moves to the Dragging brake at Zone E state 612. The 6 seconds are an estimate of the time it normally takes a brake to return to a non-actuated position from its actuated position. However, at Overstroke At Zone E state 611 state if the sensor signal returns to Zone D 504 then the processor moves to the Overstroke At Zone D state 608. Once at Dragging Brake at Zone E state 612 if the stoplight turns on again then the processor moves back to the Overstroke At Zone E state 610. If the stoplight stays off at the Dragging Brake at Zone E state 612 but the sensor signal moves to Zone D 504 of FIG. 5 then the processor moves back to Dragging Brake At Zone D state 609. The description with reference to FIGS. 6A and 6B describes one embodiment of the algorithm adapted to program the vehicle brake monitoring system to interpret input data such as stoplight signal, sensor signal and to provide an operator with information regarding the status of the brake. As will be apparent to one skilled in the art other specific embodiments are possible, for example, by varying the time out periods or the voltage zones of the sensor signals as shown in FIG. 5.

Figure 7:
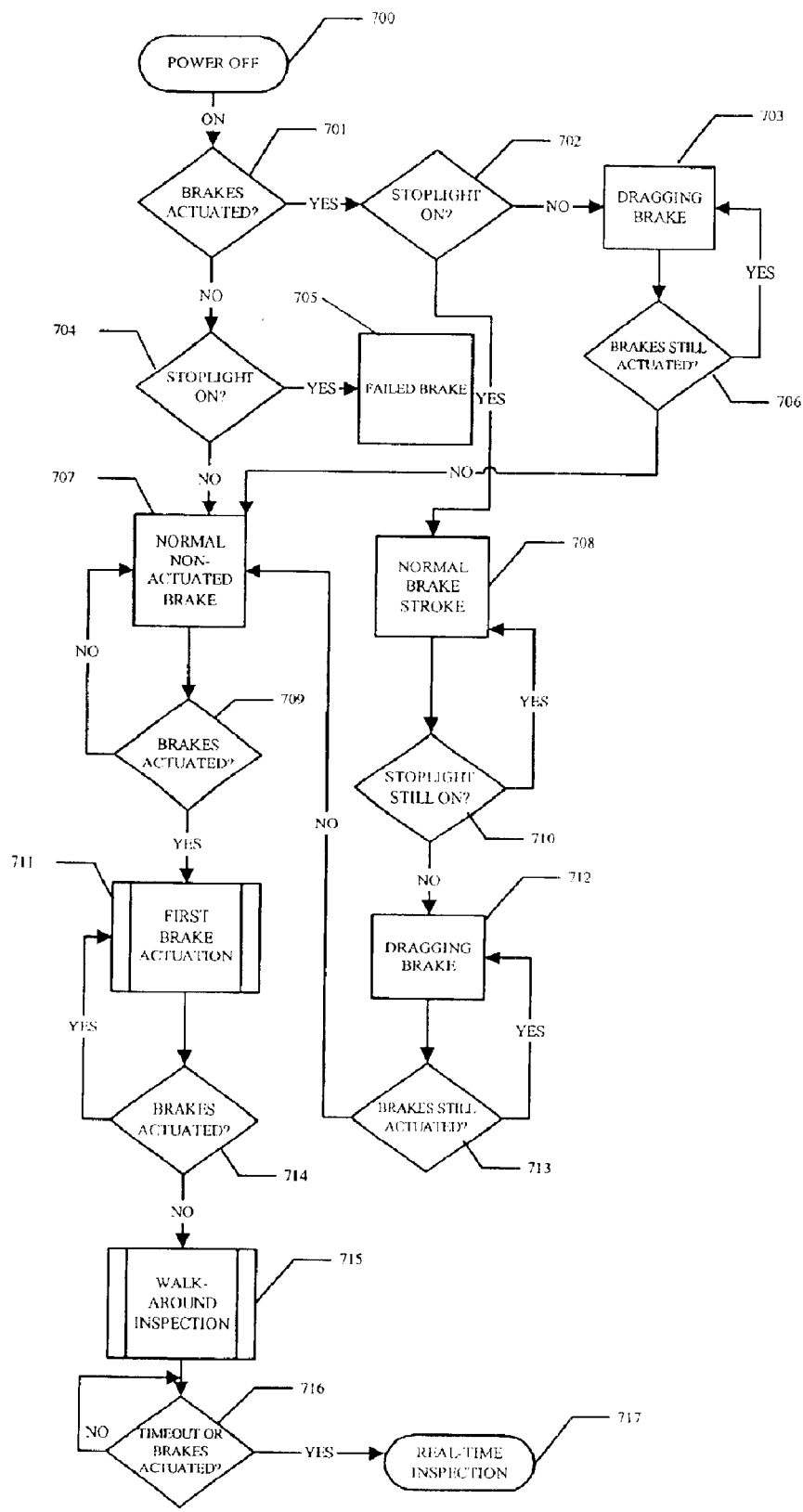
FIG. 7 is a flow-chart representing an algorithm for programming the vehicle brake monitoring system for an initial power-up monitoring of the brake conditions.

An Algorithm for an Initial Power-Up Processing of the Vehicle Brake Monitoring System for Accurately Determining the Position of the Brake Within its Stroke Movement The state diagrams of FIGS. 6A and 6B describe the real-time processing required for the operation of the vehicle brake monitoring system. In addition to the real-time processing the vehicle brake monitoring system undergoes an initial power-up procedure to initialize and diagnose the brake condition as shown in FIG. 7. Prior to driving the vehicle, the operator will depress the brake pedal to actuate all the brakes and walk around the vehicle, inspecting the vehicle brake monitoring system for evidence of brake stroke faults. The initial power-up procedure of the master processing units 205 and the remote processing units such as 210 and 215 of FIG. 2 will account for a variety of initial conditions, such as a parking brake being actuated, or a parking brake actuated but stoplight turned on.

In FIG. 7, the processing units including the master processing unit 205 and the remote processing units 210 or 215 of FIG. 2 are at the Power Off condition 700. Once the vehicle brake monitoring system is powered up and before the operator actuates the brakes for inspection purposes, each of the processing units evaluate whether their corresponding brakes are actuated at 701 by reading the sensor signal 500 of FIG. 5 as shown in FIGS. 6A and 6B. At 701 if the brakes are not actuated and the stoplight is on at 704 that indicates a failed brake at 705. However, if the brake is actuated at 701 and the stoplight signal is off at 702 the processing unit will indicate a Dragging Brake 703. The processing unit continues to evaluate whether the brakes remain actuated at 706 and so long as the brakes remain actuated at 706 the processing unit continues to indicate a Dragging Brake 703. However, once the brake is no longer actuated, the processing unit indicates a Normal Released Brake 707 and will remain in that state until the brake is actuated again at 709.

At 702 if the stoplight is on and the brake remains actuated the processing unit will indicate a Normal Braking condition at 708 and will continue to indicate a Normal Braking at 708 so long as the stoplight is on at 710. If the stoplight turns off at 710 with the brake still actuated then the processing unit will indicate a Dragging Brake condition 712. The Processing unit will continue to indicate a Dragging Brake condition at 703 as long as the brake remains actuated at 706. However, at 713 if the brake is not actuated with the stoplight in the off condition then the processing unit will indicate a Normal Released Brake at 707.

Once the processing unit indicates a Normal Released Brake at 707 it will continue to stay in that state so long as the brakes continue to remain in the released condition. However, if the driver actuates the brakes by pushing the brake pedal, that will lead to the First Brake Actuation at 711 and again the unit will remain in that state so long as the brake remains actuated. Once the brake no longer remains actuated at 714 the processing unit indicates the appropriate brake faults allowing enough time for the operator to perform a walk-around inspection at 715, checking the vehicle brake monitoring system for all the brake faults generated. These faults persist until a sufficient length of time passes, preferably 5 minutes, or until the operator actuates the brakes again 716, which ever happens first. From this event until the next power down and power up, the vehicle brake monitoring system is adapted to monitor the brake condition in real time as described above in relation to FIGS. 6A and 6B.

Figure 8:
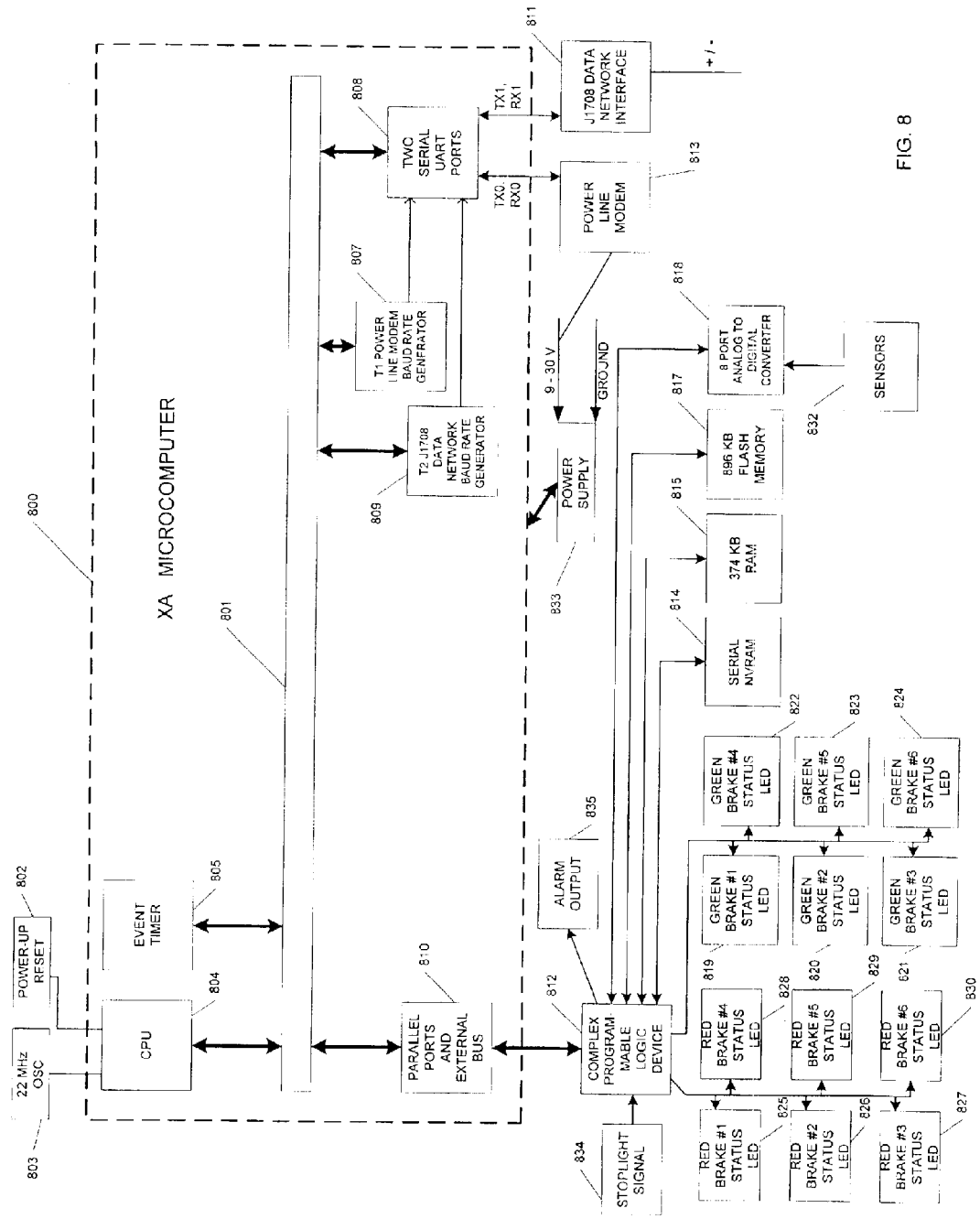
FIG. 8 is a block diagram showing a master-processing unit of the vehicle brake monitoring system.

One Embodiment of an Architecture of the Master Processing Unit of the Vehicle Brake Monitoring System In FIG. 8, one embodiment of architecture of the master processing unit 800 is shown with the electronic circuitry for processing the sensors signals 832, stoplight signal 834 and time delay signal from the counters at 805 in accordance with the algorithm described above with reference to FIGS. 6 and 7. The circuitry is located on a printed circuit board containing a microcomputer 801. In this embodiment, the microcomputer 801 comprises a Philips PXAG30 microprocessor 804 with an internal bus 836. The Philips PXAG30 microprocessor 804 is available through Philips Semiconductor of Eindhoven, The Netherlands. The computer includes two serial ports 808 each clocked by its own baud rate generators 809 and 807. The inventors have found a 2400 baud rate generator 807 for communicating with the power line modem 813 and a 9600 baud rate generator 809 for communicating with the truck status data network interface 811 to be particularly suitable.

The power line modem 813 enables communications with the remote processing units. The power line cable 311 of FIG. 3 is utilized for communications between the master processing unit and remote processing units. The power line modem 813 in the master processing unit 800 transmits and receives carrier on/off modulated signals through the master processing unit's power supply 833 for communication with the remote processing units. One power line modem 813 suitable for the purposes of a vehicle brake monitoring system is a ST7537 power line modem, which utilizes a 131 KHz carrier frequency signal with amplitude shift-keying modulation for a half-duplex mode communications protocol at a 2400 baud rate. The ST7537 power line modem is manufactured by STMicroelectronics, Inc. The communications protocol preferably supports 8 bit serial data, odd parity, and 1 stop bit, which is a widely used standard protocol for serial communications. The ST7537 is particularly suitable because it is relatively immune to a vehicle's noise, it is inexpensive and it is readily available.

The truck status data network interface 811 enables communication with the data network of the vehicle. The microcomputer 801 is programmed to send an appropriately formatted message through one of its serial ports 808 onto the vehicle's data network via the truck status data network interface 811. As shown in FIG. 2 and FIG. 3, the vehicle's data network is connected to a display unit which is adapted to display the brake condition and the performance status of other parts of the vehicle to the operator at one convenient location. Furthermore the microcomputer 801 of the master processing unit 800 will report brake fault conditions such as, overstroke, failed brake, dragging brake and sensor failure by actuating an alarm output 835.

The microcomputer 801 includes parallel ports multiplexed with associated external bus 810 for communication with devices outside the microcomputer 801. The external bus 810 is controlled by a complex programmable logic device 812. The complex programmable logic device (CPLD) 812 allows the microcomputer 801 to execute a software program residing in flash memory 817 while using an external static random access memory (RAM) with 384 kilo bytes (KB) of memory 815. A CPLD particularly suited for this system is a Cypress CY37064P100-125AC CPLD manufactured by Cypress Semiconductor of San Jose, Calif. Non-volatile memory of the software program, such as that indicating that the processing unit is connected to a first, second, third, and/or fourth pair of brakes, resides in an Electrically Erasable Programmable Read Only Memory (EEPROM) 814. The analog signal from the sensors 832 which is indicative of the stroke movement as described in FIG. 5, is converted to a digital signal using an analog to digital converter 818. Microcomputer 801 also comprises a event timers 805 for measuring the time delay data associated with the time spent by each brake in the various states as described in FIGS. 6A–B.

The software program described with reference to FIGS. 6A, 6B and 7 is executed on the microprocessor 804 for processing the signals from the sensors 832, the stoplight signal 834 and the event timers 805 for displaying each brake's current performance condition in real-time. Besides the alarm output at 835 and the broadcast signal through the truck status data network interface 811 each processing unit including the master processing 800 is adapted to display the brake condition at processing unit itself. In a master processing unit the brake condition of all brakes associated with the master processing is displayed on a combination of light emitting diodes (LED's) with different colors indicating the various performance conditions of the brakes. Each brake corresponds to a red brake LED 825–830, and a green brake LED 819–824. Each pair of red LED's 825–830 and green LED's 819–824 associated with any given brake may be combined in an on state to show orange, or in an off state to show dark. For instance, combining Green Brake #1 Status LED 819 and its corresponding Red Brake #1 Status LED 825, or leaving them both off would show an orange state and a dark state respectively.

The LED's 819–830 are also capable of blinking at variable rates of on and off states. Each brake condition corresponds to a particular combination of the color of the LED, which can be red or green, and a blink rate of the LED, which can be no blinking (steady), rapid rate blinking, slow rate blinking, and a blinking rate alternating between the rapid and slow rates.

In this embodiment a green LED 819–824, which is on and not blinking at all indicates that a brake is functioning normally. Combining the LED signals to generate an Orange LED, blinking in a rate alternating between rapid and slow rates, indicates sensor failure. Green and red, blinking alternately in another rapid rate and slow rate pattern, indicates that the brake did not actuate when requested by the driver. Red, blinking rapidly, indicates that the brake is in the overstroke condition. Red, blinking in a slow rate, indicates that the brake is in a dragging brake condition. Not only are the combinations of colors and blink rates indicative of the brake condition, but additionally the different blink rates permit a color-blind person to grasp what is being displayed.

The master processing unit 800 receives power through a electrical power supply 833 from the vehicle's electrical system through power line cable 311, which is part of the vehicle's communication network 319 as shown in FIG. 3. The two wires generally are connected to a junction box of the vehicle's electrical system to provide power. The power is preferably provided in form of a direct current +12 volts or +24 V to ground. The 22 Mhz OSC is a crystal used as the internal clock of the entire system and power-up reset 802 is a provides a power reset signal when power cycles on to the microprocessor, the complex programmable logic device 812, and the flash memory 817.

One Embodiment of Architecture of a Remote Processing Unit

A remote processing unit comprises all the electronic circuitry of the master processing unit 800 except for the master processing unit truck status data network interface 811 for enabling the display of the consolidated the brake condition data of all the brakes, and the master's alarm output 835.

Figure 9:
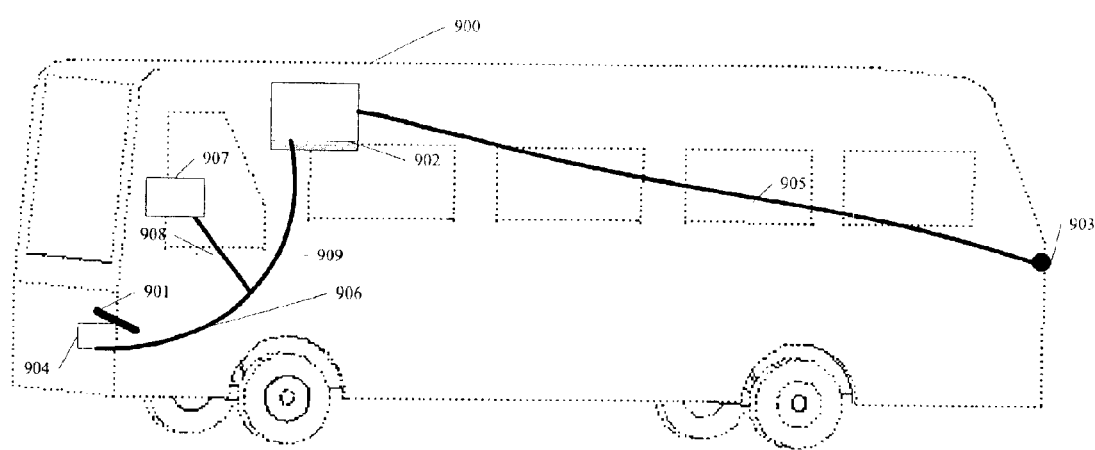
FIG. 9 is a diagram of a transit bus with a multiplexor adapted for multiplexing the stoplight signals of the bus.

A Method for Preventing Signal Interference Between a Stoplight Signal Multiplexor and the Vehicle Brake Monitoring System Many vehicles are equipped with stoplight signal indicators for indicating whether the operator has applied the brakes or not. This helps the other drivers on the road to react to a vehicle's stopping. However, as noted above the stoplight can also help in the processing of monitoring the performance of the brakes as described in FIGS. 1–8 above. In the vehicle brake monitoring system embodiment shown in FIG. 3 the stoplight signals 317 are directly connected to their respective processing units of the vehicle brake monitoring system. However, in some vehicles such as a transit bus, as shown in FIG. 9, a multiplexor 902 may be used to carry the stoplight signal to the stoplights at the rear of the bus 903. In FIG. 9 a brake pedal 901 of a vehicle is connected to a pressure switch 904, which is activated whenever the operator applies the brakes. The signal generated by the brake pedal switch 904 is multiplexed to the multiple stoplight indicators such as 903 on the vehicle 900. The same signal from the pressure switch 904 is provided to both the multiplexor 902 and the processing unit of the vehicle brake monitoring system 907, using the same wire 906 which is split into wire 908 connecting the processing unit 907 and wire 909 connecting the multiplexor 902. This could lead to signal interference between the multiplexor 902 and the processing unit 907. Because of such interference, the vehicle's brake light might be lit all the time, indicating brake actuation, whether or not the brakes are actuated.

Figure 10:
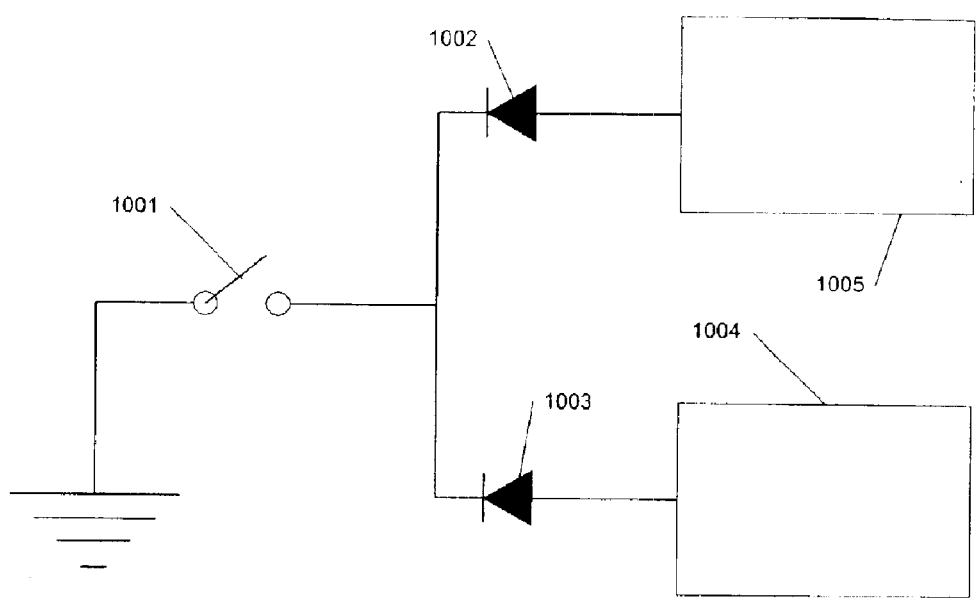
FIG. 10 shows an electrical schematic diagram showing an electrical circuit with diode cable connected to the multiplexor of FIG. 9.

One way to prevent this signal interference is shown in FIG. 10, which shows the processing unit 1004 and the multiplexor 1005 connected to the pressure switch 1001 using diode wires 1003 and 1002 respectively. The diode wires 1002 and 1003 are adapted to prevent the interference between the processing unit 1004 and the multiplexor 1005. The pressure switch 1001 indicates brake activation by a providing a direct connection to ground. When the pressure switch 1001 is not activated, its output is in a float state. The multiplexor 1005 and the processing unit 1004 each look for the ground to indicate a brake activation. The circuitry of the processing unit 1004 includes a path to ground through a 10K OHM resistor. The circuitry of the multiplexor 1005 is designed such that the path to ground through the 10K OHM resistor is misinterpreted as an activated pressure switch 1001, regardless of the actual state of the pressure switch 1001. The use of the diode wires 1002 and 1003 ensures that both the multiplexor 1005 and the processing unit 1004 each only sees one path to ground, through the pressure switch 1001. Diode wire 1002 is oriented such that current can only flow from the multiplexor 1005 to the pressure switch 1001. Diode wire 1003 is oriented such that current can only flow from the processing unit 1004 to the pressure switch 1001. When the pressure switch 1001 is activated, the multiplexor unit 1005 senses the grounded state of the pressure switch 1001, and the processing unit 1004 senses the grounded state of the pressure switch 1001. When the pressure switch 1001 is not activated, the multiplexor unit 1005 senses the float state correctly, since the path to ground through the 10K ohm resistor in the processing unit 1004 is now blocked. The processing unit 1004 also correctly senses the float state of the pressure switch 1001. The inputs of the processing unit 1004 and the multiplexor 1005 are now both isolated from each other, while still each detecting the state of the pressure switch 1001 correctly.

Having described and illustrated the principles of our invention with reference to illustrated embodiments, it will be recognized that the illustrated embodiments can be modified in arrangement and detail without departing from such principles. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for indicating performance condition of a brake associated with a vehicle, the method comprising:
   receiving a stoplight signal, the stoplight signal having an on state or an off state;
   receiving a sensor signal corresponding to a stroke movement of the brake, wherein the corresponding sensor signal is divided into multiple zones corresponding to multiple positions of the brake within its stroke movement;
   activating a time out clock adapted to generate a time out signal indicative of a delay interval between corresponding changes in the stoplight signal and the sensor signal;
   processing input data comprising the stoplight signal, the corresponding sensor signal and the time out signal; and
   indicating output data indicative of the condition of the brake.

2. A method for indicating performance condition of a brake associated with a vehicle, the method comprising:
   receiving a signal at least indicative of whether a brake pedal associated with the brake has been applied or released;
   receiving a brake stroke sensor signal corresponding to a stroke movement of the brake, wherein the corresponding brake stroke sensor signal is divided into multiple zones corresponding to multiple positions of the brake within its stroke movement;
   activating a time out clock adapted to generate a time out signal indicative of a delay interval between corresponding changes in the brake stroke sensor signal and the signal at least indicative of whether the brake pedal associated with the brake has been applied or released;
   processing input data comprising the signal at least indicative of whether the brake pedal associated with the brake has been applied or released, the corresponding brake stroke sensor signal and the time out signal; and
   indicating output data indicative of the condition of the brake.

3. The method of claim 2, wherein the condition of the brake is normal released brake, normal braking, overstroke, dragging brake, sensor failure or failed brake.

4. The method of claim 3, further comprising activating an alarm upon generating the overstroke brake condition, the failure brake condition, the sensor failure condition or the dragging brake condition.

5. The method of claim 3, the sensor signal corresponds to voltage values and the multiple zones correspond to multiple ranges of the voltage values.

6. The method of claim 5, wherein the processing the input data comprises generating the sensor failure condition in response to receiving a low voltage brake stroke sensor signal.

7. The method of claim 5, wherein the multiple zones comprise Zone A, Zone B, Zone C, Zone D and Zone E, wherein Zone A corresponds to the brake being in the normal released brake condition, Zone B corresponds to the brake being in the normal braking condition, Zone C corresponds to the brake approaching the overstroke condition, Zone D and Zone E correspond to the brake being in the overstroke condition.

8. The method of claim 7, wherein the processing the input data comprises generating the failed brake condition in response to the brake stroke sensor signal being in the Zone A, the signal at least indicative of whether the brake pedal associated with the brake has been applied or released is indicating an applied brake pedal and receiving the time out signal after a delay interval related to a time required for the brake to actuate.

9. The method of claim 7, wherein the processing the input data comprises generating the dragging brake condition in response to the brake stroke sensor signal being in the Zone B, the signal at least indicative of whether the brake pedal associated with the brake has been applied or released is indicating a released brake pedal and receiving the time out signal after a delay interval related to a time required for the brake to return from its actuated position to its non-actuated position.

10. The method of claim 7, wherein the processing input data comprises generating the dragging brake condition in response to the brake stroke sensor signal being in the Zone D, the signal at least indicative of whether the brake pedal associated with the brake has been applied or released is indicating a released brake pedal and receiving the time out signal after a delay interval related to a time required for the brake to return from its actuated position to its non-actuated position.

11. The method of claim 7, wherein the processing the input data comprises generating the overstroke brake condition in response to the signal at least indicative of whether the brake pedal associated with the brake has been applied or released is indicating an applied brake pedal, the brake stroke sensor signal being in the Zone A or the Zone D and receiving the time out signal after a delay interval related to a time required for the signal at least indicative of whether the brake pedal associated with the brake has been applied or released to indicate a released brake pedal after the sensor signal reaches the Zone A.

12. The method of claim 7, wherein the processing the input data comprises generating the dragging brake condition in response to the signal at least indicative of whether the brake pedal associated with the brake has been applied or released is indicating a released brake pedal, the brake stroke sensor signal reaching the Zone E, and receiving the time out signal after a delay interval related to a time required for the brake to return from its actuated position to its non-actuated position.

13. The method of claim 7, wherein the processing the input data comprises generating the normal braking condition in response to the brake stroke sensor signal being in the Zone B, and the signal at least indicative of whether the brake pedal associated with the brake has been applied or released is indicating an applied brake pedal.

14. The method of claim 7, wherein the processing the input data comprises generating the normal braking condition in response to the brake stroke sensor signal being in the Zone C and the signal at least indicative of whether the brake pedal associated with the brake has been applied or released is indicating an applied brake pedal.

15. The method of claim 7, wherein the processing the input data comprises generating the normal braking condition in response to the brake stroke sensor signal being in the Zone C and the signal at least indicative of whether the brake pedal associated with the brake has been applied or released is indicating a released brake pedal.

16. The method of claim 7, wherein the processing input data comprises generating the normal released brake condition in response to the brake stroke sensor signal being in the Zone A, and the signal at least indicative of whether the brake pedal associated with the brake has been applied or released is indicating a released brake pedal.

17. The method of claim 7, wherein the processing input data comprises generating the overstroke brake condition in response to the signal at least indicative of whether the brake pedal associated with the brake has been applied or released is indicating an applied brake pedal, and the brake stroke sensor signal reaching the Zone E.

18. The method of claim 2, wherein the output data indicative of the condition of the brake is indicated along with data indicative of a location of the brake.

19. The method of claim 2, further comprising:
detecting a first brake actuation;
indicating the condition of the brakes upon the first brake actuation;
in response to indicating the condition of the brakes upon the first brake actuation activating a inspection delay counter having an expiration time; and
continuing to indicate the condition of the brakes upon the first brake actuation until the expiration time of the inspection delay counter is reached or a second brake actuation.

20. A vehicle brake monitoring system for monitoring condition of multiple brakes of a vehicle, the multiple brakes associated with a brake pedal, each of the multiple brakes associated with a brake actuator, each of the multiple brakes having a stroke movement, the system comprising:
a signal generator adapted for generating a signal at least indicative of the brake pedal being applied or released;
multiple brake stroke sensors correspondingly associated with the multiple brakes and adapted to correspondingly generate brake stroke sensor signals indicating the stroke movement;
a time out clock adapted to generate a time out signal indicative of a delay interval between corresponding changes in the signal at least indicative of the brake pedal being applied or released and the corresponding brake stroke sensor signal; and
a processing unit, the processing unit being programmed to generate output data indicative of the condition of the multiple brakes by using their corresponding brake stroke sensor signals, the signal at least indicative of the brake pedal being applied or released and the time out signal.

21. The vehicle brake monitoring system of claim 20 further comprising a display unit adapted to display the output data indicative of the condition of multiple brakes of the vehicle.

22. The vehicle brake monitoring system of claim 20 further comprising a truck status data network connected to the processing unit.

23. The vehicle brake monitoring system of claim 22, wherein the truck status data network is a J1708, J1939 or PLC4TRUCKS data network.

24. The vehicle brake monitoring system of claim 22, wherein the truck status data network is communicative with network compatible devices for monitoring condition of transmission, engine and Anti-Lock Brake System associated with the vehicle.

25. The vehicle brake monitoring system of claim 22, wherein each of the multiple brake stroke sensors comprises Hall-effect sensors adapted to transmit the sensor signal.

26. The vehicle brake monitoring system of claim 20, wherein the brake actuators are pneumatic actuators adapted to engage and disengage their associated brakes in response to the brake pedal being applied and released.

27. The vehicle brake monitoring system of claim 20, wherein the output data indicative of the condition of the brakes comprises normal released brake, normal braking, overstroke, failed brake, sensor failure and dragging brake.

28. The vehicle brake monitoring system of claim 27 further comprising an alarm, wherein the processing unit is programmed to activate the alarm upon indicating the condition of any one of the multiple brakes as overstroke, dragging brake, sensor failure or failed brake.

29. The vehicle brake monitoring system of claim 20 wherein the vehicle comprises a tractor unit and at least one trailer unit, wherein the processing unit comprises a master processing unit for monitoring the brakes of the tractor unit, and at least one remote processing unit for monitoring the brakes of the trailer unit.

30. The vehicle brake monitoring system of claim 29, further comprising:
power line cables; and
a power line modem, the power line modem adapted for connecting the master processing unit with the at least one remote processing unit.

31. The vehicle brake monitoring system of claim 30, wherein the power line cables are further adapted to supply electrical power to the master processing unit and the at least one remote processing unit.

32. The vehicle brake monitoring system of claim 20, wherein diode wires are used to connect the processing unit and a multiplexor to the signal generator adapted for generating the signal at least indicative of the brake pedal being applied or released.

33. A vehicle brake monitoring system for indicating the performance of a vehicle brake, the system comprising:
a signal at least indicative of a brake pedal being applied or released;
a brake stroke sensor for generating a brake stroke sensor signal corresponding to a stroke movement of the brake;
a time out clock adapted to generate a time out signal indicative of a delay interval between corresponding changes in the signal at least indicative of the brake pedal being applied or released and the brake stroke sensor signal; and a processor for processing the signal at least indicative of the brake pedal being applied or released, the sensor signal and the time out signal and indicating the performance of the brake.

34. The vehicle brake monitoring system of claim 33 further comprising a display unit for indicating the performance of the brake.

35. The vehicle brake monitoring system of claim 34, wherein the display unit is adapted to indicate the performance of the brake as normal released brake, normal braking, dragging brake, overstroke, sensor failure and failed brake.

36. The vehicle brake monitoring system of claim 33, wherein the processor is adapted to activate an alarm when the performance of the vehicle brake is indicated as overstroke, sensor failure, failed brake or dragging brake.

37. The system of claim 33, further comprising a signal generator for generating signal at least indicative of a brake pedal being applied or released based on monitoring pressure within brake lines associated with the brake pedal.

* * * * *